Feb. 26, 1963    T. CANTOR    3,079,187
FASTENING APPARATUS
Filed Dec. 6, 1961

INVENTOR.
THEODORE CANTOR
BY
*Alan K. Roberts*
ATTORNEY

United States Patent Office 3,079,187
Patented Feb. 26, 1963

3,079,187
FASTENING APPARATUS
Theodore Cantor, Yonkers, N.Y., assignor to Manostat Corporation, New York, N.Y.
Filed Dec. 6, 1961, Ser. No. 157,511
4 Claims. (Cl. 287—116)

This invention relates to fastening apparatus such as, for example, clamping devices.

In locking tubular members or the like together, it is sometimes necessary to employ collars or the like. Frequently, because of the arrangement or disposition of the tubular members, the use of conventional collars is impossible.

Relative to this difficulty, it is an object of the invention to provide an improved fastening or clamping device which is adapted for being readily mounted on parts which are to be connected to each other, despite the fact that these parts may be inconveniently disposed or are so arranged as to make a conventional fastening operation impossible.

It is a further object of the invention to provide an improved fastening or clamping device which readily accommodates tolerances and size differences in the parts to be fastened.

Still another object of the invention relates to the provision of an improved clamping or fastening device which enables fine adjustments of the clamping or fastening forces.

Yet another object of the invention relates to the provision of devices of the aforesaid type which are readily removed from the parts which they connect.

A further object of the invention is to provide an improved joint or juncture employing the improved fastening device referred to above.

Various other objects are also contemplated within the purview of the invention and, to achieve all of these objectives, it is proposed that a clamping device be provided therein, according to one embodiment of the invention, engageable clamping elements are each fabricated of separable sections which are readily assembled about the respective parts to be connected, these sections being then held together in a unique arrangement.

An auxiliary feature of the invention resides in the particular mode employed for holding the aforesaid sections together as will be seen.

Another feature is the technique proposed for aligning the sections of each clamping element with each other.

Still another feature is the technique, as will be shown, of constituting plug and socket elements by the use of the above-noted sections.

Advantages of the invention include, firstly, that the parts required may be economically manufactured with the use of mass production techniques and, secondly, that a clamp results which is especially well suited for glass joints and the like.

Other objects, features and advantages of the invention will appear from the following description of a preferred embodiment as illustrated in the accompanying drawing in which.

The general case with which the invention is concerned is that according to which there are to be fastened together two members respectively having engageable portions.

These members may, for example, be male and female members adapted to engage in mating relationship and may further be members which are tubular in shape and which are engaged in end-to-end coaxial manner.

According to the invention, the engageable portions of the members to be fastened or clamped together, are so manipulated as to be urged towards one another so that the associated members are likewise urged towards one another and thus can be held in locked engagement.

Figure 1:
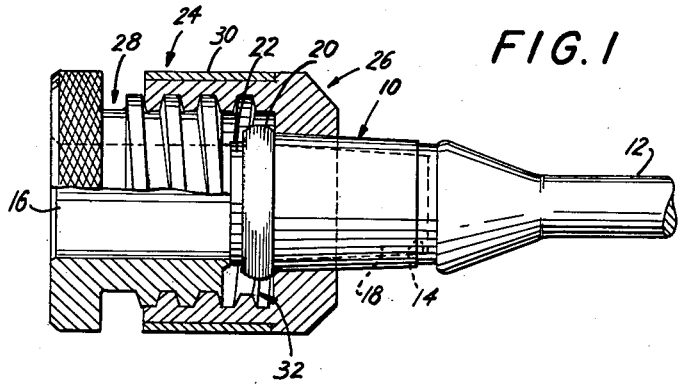
FIG. 1 is a side view, partly in section, of a tapered glass joint employing a clamping device provided in accordance with a preferred embodiment of the invention.

The members to be fastened in FIG. 1 constitute cooperatively a tapered glass joint. This joint includes female member 10 having a tubular extension 12 and an internal opening 14, there being further included in the assembly a male or plug member 16 having a tapered end portion 18 adapted to seat in mating engagement within the female portion 10.

Both of the male and female members of the tapered joint illustrated in FIG. 1 are provided with engageable portions according to the general case. These engageable portions are, in the illustrated embodiment, annular beads 20 and 22.

Annular bead 20 associated with female member 10 constitutes a bulbous protrusion at the end of said member. Annular bead 22 associated with male member 16 also constitutes a bulbous protrusion which, instead of being positioned at the end of said male member, encircles the latter at a position spaced from the end of the same. Bead 22 limits the extent of penetration of male member 16 into the female member 10.

It is a function of the invention to provide means for clamping the members 10 and 16 together and to hold the same in locked relationship. This result is achieved according to the invention by means of urging beads 20 and 22 together whereupon the principal aim of the invention is realized.

To this end, there is provided a clamping assembly 24 inclusive of a socket element or component 26, a plug component or element 28, and a fastening device 30, each of which will be discussed in greater detail hereinafter.

Socket 26 and plug 28 cooperatively define a chamber 32 which is an enclosure of variable extent. It is within the chamber 32 that beads 20 and 22 are accommodated, the penetration of plug 28 into the socket 26 urging beads 20 and 22 together thereby locking male member 16 in mating engagement with the female members 10.

It will be obvious upon an inspection of FIG. 1 that, if socket member 26 consisted of an integral annular construction and if female member 10 at its tubular extremity 12 were to be permanently affixed to some utilization device, substantial difficulty would be encountered in mounting socket member 26 on said female member. It should also be apparent that if socket member 26 were to be an integral annular member, its fixed diameter might engender difficulties as regards tolerances in the outer diameter of the female member 10. To avoid these difficulties, the invention contemplates a special construction of the socket member 26 as is best seen with reference to FIGS. 2 and 3.

Figure 2:
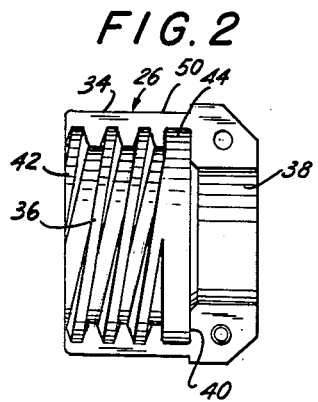
FIG. 2 is a side view of a part of an element employed in the clamping device of FIG. 1 with a slight modification.
Figure 3:
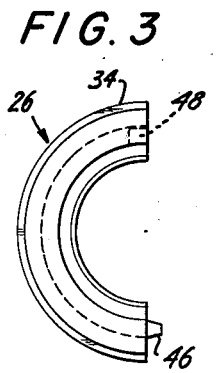
FIG. 3 is a top view of the component illustrated in FIG. 2.

In FIGS. 2 and 3, it is seen that socket member 26 is fabricated in the form of two complementary halves 34. Each half is provided with an axially disposed bore section adapted to form part of a bore of generally circular cross-section. More particularly, there is a bore section 36 and a bore section 38 separated by a shoulder 40.

Each half 34 is provided with an internal thread 42 which is adapted to accommodate a corresponding thread on the plug member 28. Thread 42 may terminate, as a slight modification, in an unthreaded section 44 corresponding to the chamber 32 of FIG. 1.

It will be noted that each of halves 34 is provided with a protrusion 46 and a hole 48 whereby the halves may be aligned and engaged. In practice, the halves are mounted on the member with respect to which a fastening operation is to be performed with the shoulder 40 in position against the associated annular bead or engageable protrusion and with protrusions 46 and holes 48 engaged.

Socket member 26 is provided with an annular recess 50 which opens radially outwards as well as in axial direction. The purpose of this recess will become hereinafter apparent.

It will be appreciated from what has been stated above that the provision of a socket member formed of complementary sections or halves enables the socket to be mounted on a member to be clamped whatever may be the position or disposition of the latter. It will also be apparent that the engagement of the complementary sections of the socket by protrusions 46 and holes 48 enables the socket to accommodate relatively large tolerances in the size of the member to be fastened.

Figure 4:
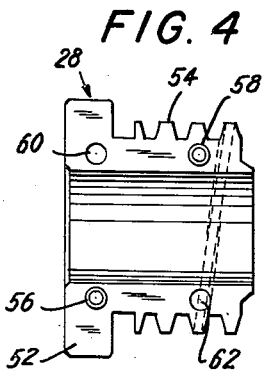
FIG. 4 is a side view of a part of another element of the clamping device of FIG. 1.
Figure 5:
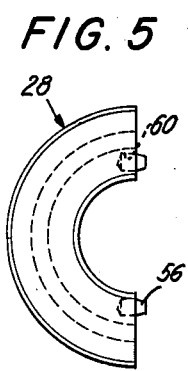
FIG. 5 is a top view of the component of FIG. 4.

FIGS. 4 and 5 illustrate that the plug member 28 is also formed of complementary halves, and thus the same advantages, which inure to the socket 26, inure as well to the benefit of plug 28.

Plug 28 consists of a knurled knob 52 adapted for being manually manipulated, and further includes a threaded portion 54 having a thread corresponding to that of the associated socket.

Plug 28 is provided with protrusions 56 and 58 and is also provided with the holes 60 and 62 by means of which the complementary halves or sections of the plug are aligned and connected together.

Relative to the use of the above apparatus and with the halves of socket 26 mounted in position as indicated in FIG. 1, a band or other such fastening device 30 is positioned in the recess 50 of the socket 26 whereupon the halves of said socket are releasably maintained in relatively fixed position. The socket then constitutes an abutment for bead 20 and the halves of the socket cooperatively define an internal thread. At the same time, the halves of the plug 28 are maintained in relatively fixed relationship due to the accommodation of the plug within said socket.

Inasmuch as the plug and socket are threadably engaged, the plug is enabled to engage against bead 22 and urge the latter in the direction of the bead 20. The provision of a thread results in a relatively fine adjustment.

It is to be noted that the fastening device 30 can be of various constructions. This device may consist merely of a friction tape or alternatively can be a split ring or clamp or may be of any construction whatsoever provided that the fastening member 30 is sufficiently strong to maintain the halves of socket member 26 in relatively fixed engagement.

According to the method of the invention, there is provided a technique for holding firmly together coaxially disposed male and female members in mating engagement.

Based on the assumption that the male and female members have engageable portions thereon, the method of the invention comprises inserting the male member into the femal member and juxtaposing said engageable portions.

Thereafter a plurality of socket sections are peripherally arranged around one of the aforesaid male or female members such that an internal thread is defined.

Next there is pheripherally arranged around the other of said male or female members a plurality of further sections adapted to constitute a plug defining an external thread corresponding to the internal thread of the socket member.

With all of the sections of the socket and plug members held together, the threaded engagement of the socket and plug is adjusted to sandwich the engageable portions therebetween whereupon the male and female members are held in mating engagement.

It will be readily understood that the particular embodiments of the invention related above is a comparatively narrow version of the general case.

For example, while reference has been made to male and female members, illustrated as generally circular members, it will be appreciated that the invention would apply as well to other types of members such as, for example, two solid members of, for example, square shaped cross-sections which are to be held in end to end relationship.

At the same time, it will be appreciated that the engageable portions on the members to be fastened need not necessarily be constituted by annular beads and may instead, for example, be recesses or spaced protrusions or in fact any structure admitting of an engagement whereby the members to be fastened may be urged together.

Similarly, although the sections of the socket and plug members have been indicated as being alignable by means of protrusions and holes, it will be appreciated that other such means might be employed and that, for example, the complementary halves might even be hinged together.

Still further, types of engagement other than threaded engagement might be provided between said socket and plug members.

It will be readily appreciated that the components of the clamping device of the invention can be economically manufactured with mass production techniques. In practice, the components can be readily fabricated, for example, from polypropylene. It will be appreciated that a rather tenacious clamping mechanism is provided wherein a relatively fine adjustment of the clamping force is possible.

In accordance with the objectives of the invention, it is made possible by the clamping device of FIGS. 1–5 to assemble the components thereof on the members to be fastened whatever may be the disposition of the latter. Also, a ready accommodation for relatively large tolerances in the sizes of the members to be connected together is provided.

There will now be obvious to those skilled in the art many modifications and variations of the structure set forth above. These modifications and variations will, however, not depart from the scope of the invention if defined by the following claims.

What is claimed is:

1. A clamp for locking together male and female members engaged in mating relationship, said female member defining an internal opening wherein is accommodated said male member and including an external annular bead, said male member also including an annular external bead; said clamp comprising a socket defining a bore and including a shoulder in said bore, said bore accommodating said female member with the bead thereon in abutting relationship with said shoulder, a thread on said socket in said bore, a plug encircling said male member and including a knob portion adapted for manual engagement and further including a threaded portion engaging the thread in said bore whereby to confine cooperatively with the shoulder in the bore a variable chamber wherein are located said beads, said plug engaging the thread in said bore being adapted to exert a force against the bead on said male member to urge the latter into said female member, said socket and plug each being components which include complementary halves, said halves defining and including corresponding and mating openings and protrusions for aligning and engaging the associated halves, said socket being provided with a peripheral annular recess, and a fastening member accommodated in said recess and holding the halves of the socket and thereby the halves of the plug together.

2. Apparatus comprising generally circular male and female members engaged in mating and coaxial relationship, said female member defining an internal opening wherein is accommodated said male member and including an external annular bead, an annular bead on and encircling said male member and adapted to limit the penetration of the male member into the female member, a socket defining first and second coaxially disposed bore sections and accommodating the female member in the first bore section, said first bore section being of smaller diameter than the second bore section and being of larger diameter than said female member but of smaller diameter than the bead on the latter whereby said female member is adapted to extend through said first bore to the extent of the bead thereon, the second bore section being of a diameter greater than that of both said beads and said male member whereby to accommodate freely the male member and bead thereon, said socket including a thread in the second bore section, a plug including a knob portion adapted for manual engagement and further including a threaded portion engaging the thread in said second bore section whereby to confine in the second bore section a chamber having a controllably variable axial extent, said plug encircling said male member and defining an axial bore of greater diameter than said male member but of lesser diameter than the bead on said male member whereby the plug is adapted to exert an axial force against the bead on said male member, said socket and plug each being components which include complementary sections, the complementary sections defining and including corresponding and mating openings and protrusions for aligning and engaging the latter said sections, said socket being provided with a peripheral annular recess, and a fastening member accommodated in said recess and holding the sections of the socket and thereby the sections of the plug together.

3. For use with generally circular male and female members adapted to be engaged in mating and coaxial relationship, said female member defining an internal opening wherein is accommodated said male member and including an external annular bead, and an annular bead on and encircling said male member; apparatus comprising a socket defining first and second coaxially disposed bore sections and adapted for accommodating the female member in the first bore section, said first bore being of larger diameter than said female member but of smaller diameter than the bead on the latter whereby said female member is adapted to extend through said first bore to the extent of the bead thereon, the second bore section being of a diameter greater than that of both said beads and said male member whereby to accommodate freely the male member and bead thereon, said socket including a helical thread in said second bore section, a plug including a knob portion adapted for manual engagement and further including a threaded portion engaging the thread in said second bore section whereby to confine in the second bore section a chamber having a controllably variable axial extent, said plug encircling said male member and defining an axial bore of greater diameter than said male member but of lesser diameter than the bead on said male member whereby the plug is adapted to exert an axial force against the bead on said male member, said socket and plug each including complementary separable portions, and a fastening member holding the portions of the socket and thereby the portions of the plug together, penetration of the plug into the socket urging said beads and thereby said male and female members together.

4. In combination with apparatus comprising generally circular male and female members engaged in mating and coaxial relationship, said female member defining an internal opening wherein is accommodated said male member and including an external annular bead, and an annular bead on and encircling said male member: a socket defining first and second coaxially disposed bore sections and accommodating the female member in the first bore section, said first bore section being of smaller diameter than the second bore section and being of larger diameter than said female member but of smaller diameter than the bead on the latter whereby said female member is adapted to extend through said first bore to the extent of the bead thereon, the second bore section being of a diameter greater than that of both said beads and said male member whereby to accommodate freely the male member and bead thereon, said socket including a thread in the second bore section, a plug including a knob portion adapted for manual engagement and further including a threaded portion engaging the thread in said second bore section whereby to confine in the second bore section a chamber having a controllably variable axial extent, said plug encircling said male member and defining an axial bore of greater diameter than said male member but of lesser diameter than the bead on said male member whereby the plug is adapted to exert an axial force against the bead on said male member, said socket and plug each being components which include complementary halves, said halves defining and including corresponding and mating openings and protrusions for aligning and engaging the associated halves, said socket being provided with a peripheral annular recess opening axially and radially outwards, and a fastening member accommodated in said recess and holding the halves of the socket and thereby the halves of the plug together.

References Cited in the file of this patent

UNITED STATES PATENTS

| 320,683 | Phillis | June 23, 1885 |
| 448,717 | Hogan | Mar. 24, 1891 |
| 1,098,294 | Patty | May 26, 1914 |

FOREIGN PATENTS

| 147,972 | Austria | Dec. 10, 1936 |
| 367,152 | Germany | Jan. 18, 1923 |